US006349954B1

(12) United States Patent
Deziel

(10) Patent No.: US 6,349,954 B1
(45) Date of Patent: Feb. 26, 2002

(54) FENDER APPARATUS

(76) Inventor: Michael D. Deziel, 720 2 Ave. NE., East Grand Forks, MN (US) 56721

( * ) Notice: Subject to any disclaimer, the term of this patent is extended or adjusted under 35 U.S.C. 154(b) by 0 days.

(21) Appl. No.: 09/272,231

(22) Filed: Mar. 18, 1999

Related U.S. Application Data

(63) Continuation-in-part of application No. 09/055,161, filed on Apr. 4, 1998, now abandoned.

(51) Int. Cl.[7] ............................................. B62D 25/18
(52) U.S. Cl. ........................ 280/156; 280/849; 296/198
(58) Field of Search ................................ 280/156, 853, 280/160, 848, 154, 849; 296/198

(56) References Cited

U.S. PATENT DOCUMENTS

| | | | | |
|---|---|---|---|---|
| 5,074,573 A | * | 12/1991 | Dick | 280/157 |
| 5,169,167 A | * | 12/1992 | Willson et al. | 280/157 |
| 5,511,808 A | * | 4/1996 | Rowland | 280/157 |
| 5,794,956 A | * | 8/1998 | Hurlburt et al. | 280/156 |
| 5,839,743 A | * | 11/1998 | Weinkauf | 280/154 |
| 6,109,621 A | * | 8/2000 | Hettich et al. | 280/5.52 |

* cited by examiner

*Primary Examiner*—Kenneth R. Rice
*Assistant Examiner*—Lynda Jasmin
(74) *Attorney, Agent, or Firm*—Robert E. Kleve

(57) ABSTRACT

The invention comprises a grader fender apparatus in a grader. The apparatus has front and rear fenders and front and rear support arms with the front support arms mounted to the leaning bar of the grader and the rear support arms mounted to the tandem frame of the grader. The front support arms extend upward from the lean bar to a location adjacent the top of the front wheels of the grader, with horizontal sockets extending outward toward the wheels mounted to the tops of the support arms. The fenders are each elongated and each have a fender rod mounted intermediate the length and extending horizontally inward and have substantially square inner ends adapted to be receive in the sockets of the support arms in non rotational manner for detachably mounting the fenders to the grader. The front fenders are mounted to the lean bar of the grader to tilt with the lean bar when the lean bar tilts the front wheels of the grader.

3 Claims, 6 Drawing Sheets

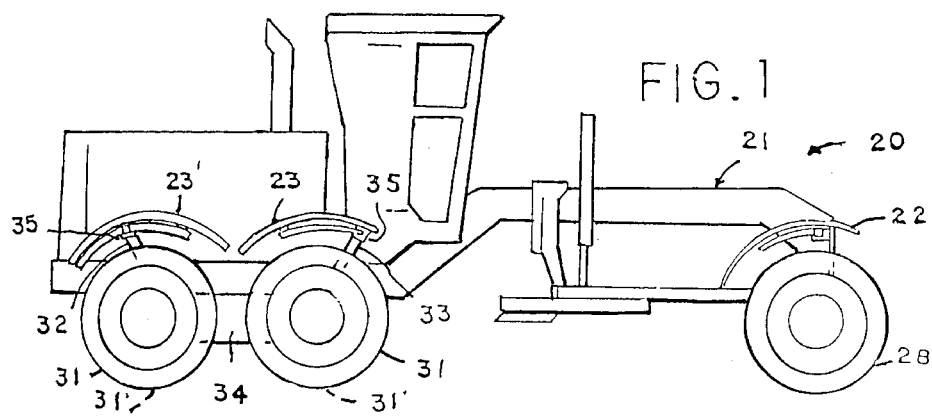
FIG. 1
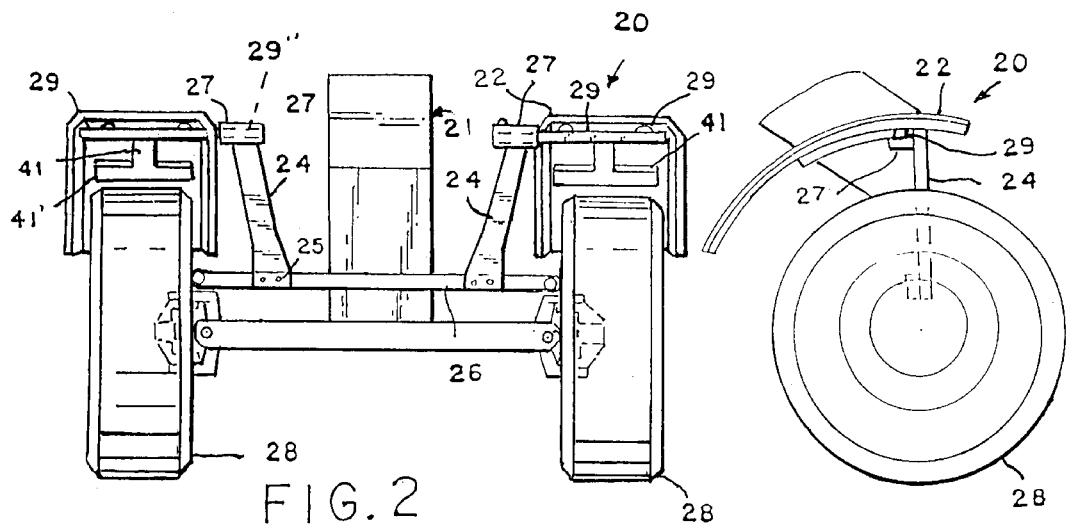
FIG. 2
FIG. 3
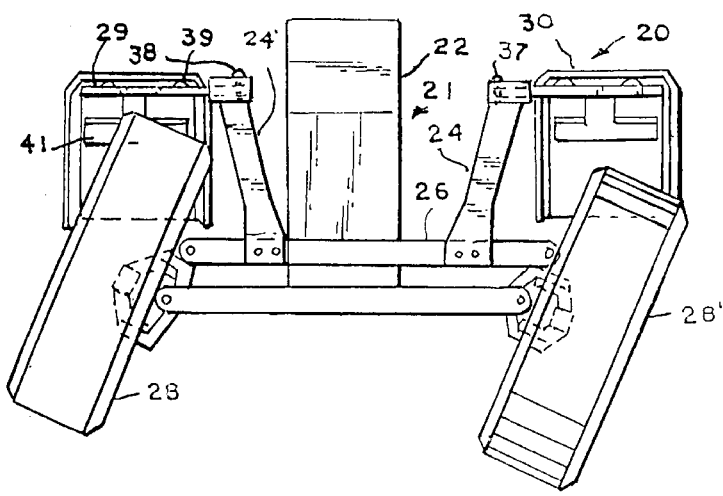
FIG. 4

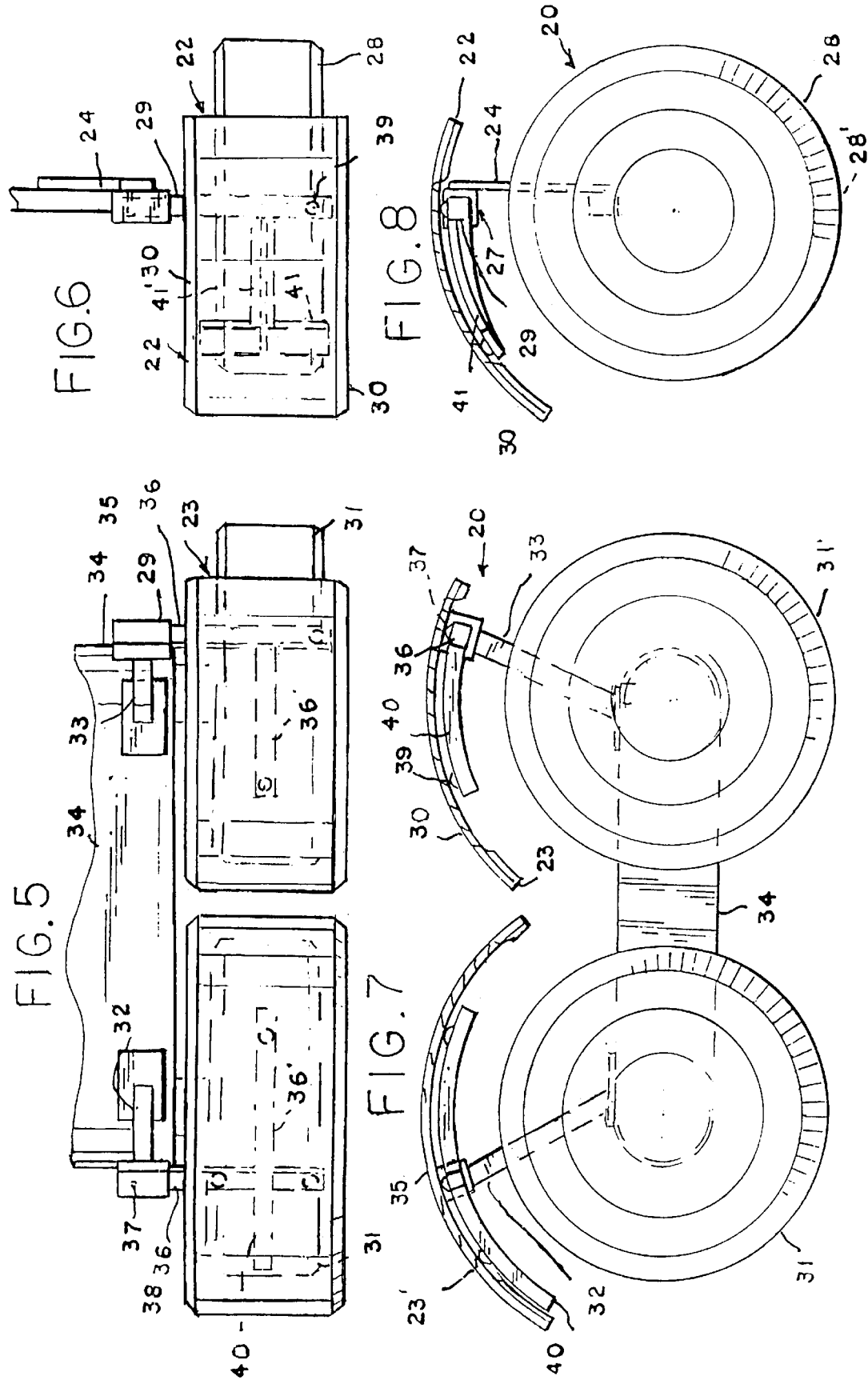

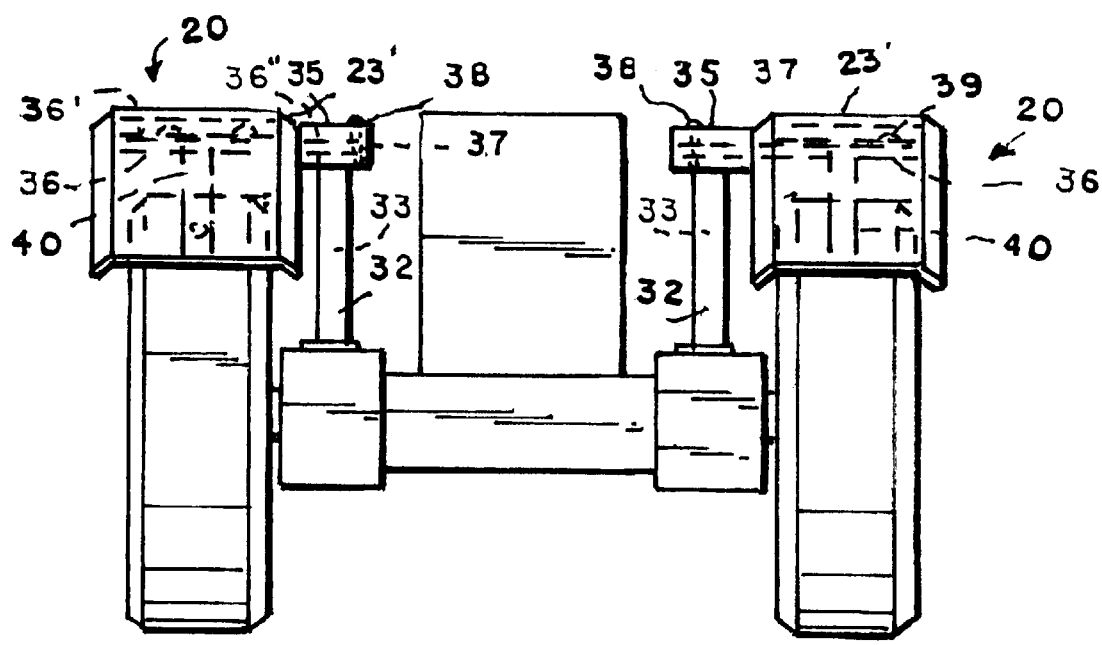

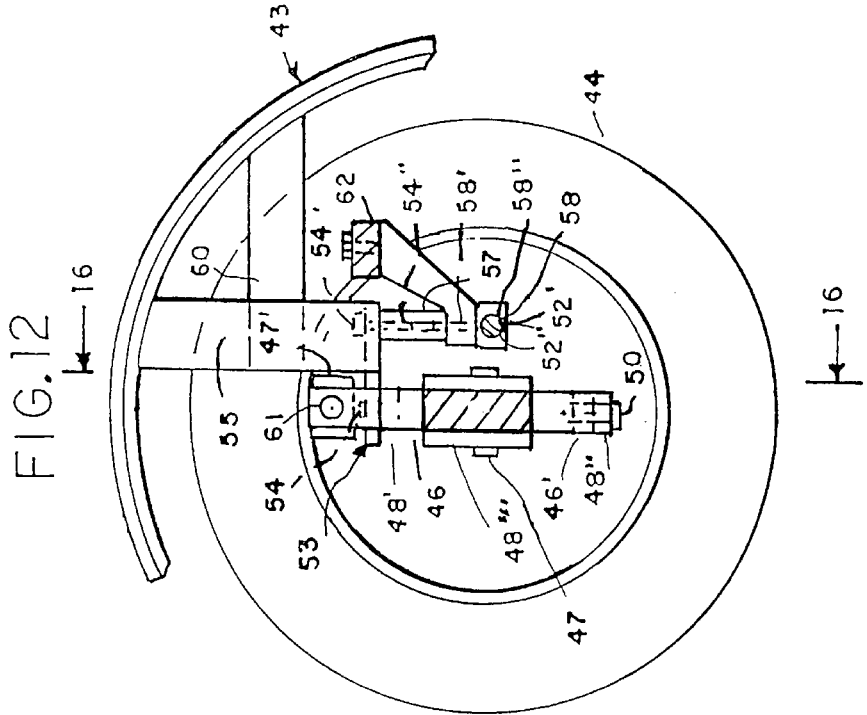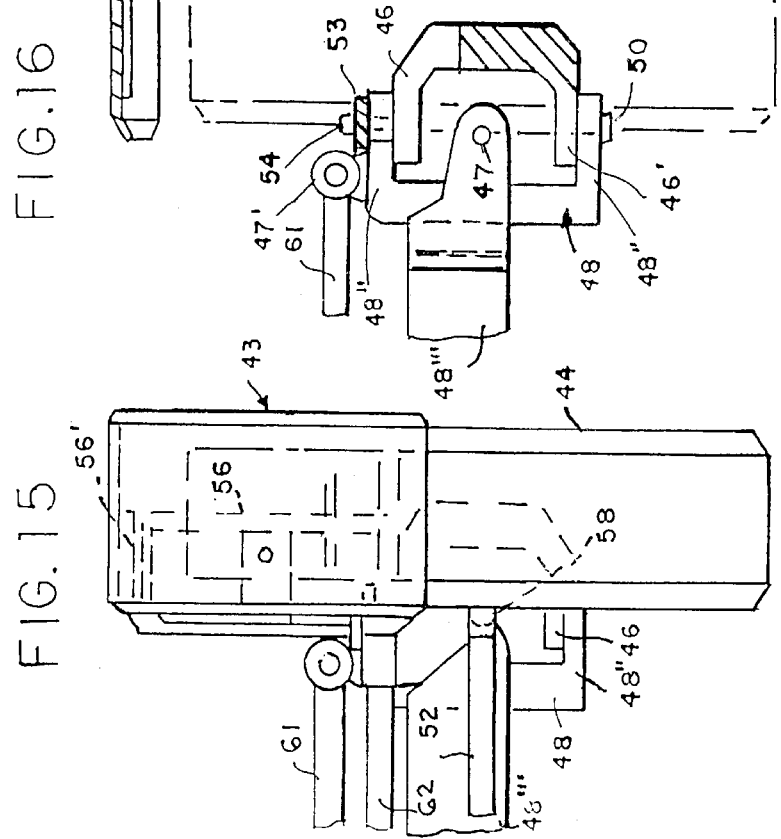

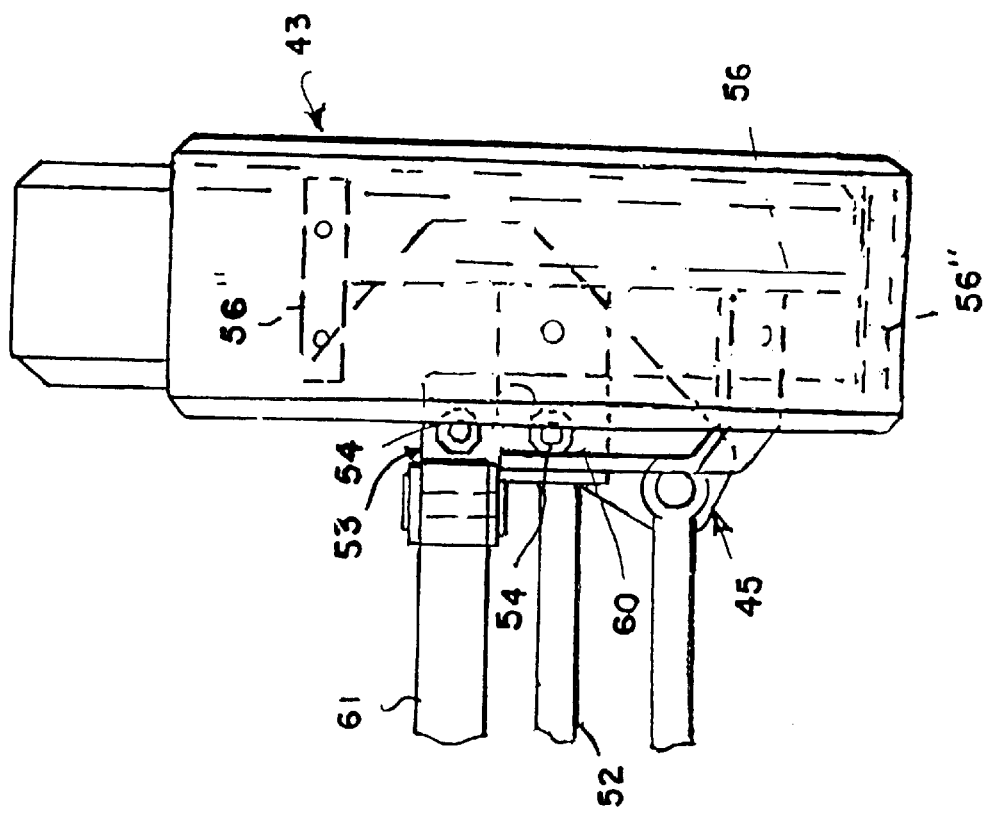
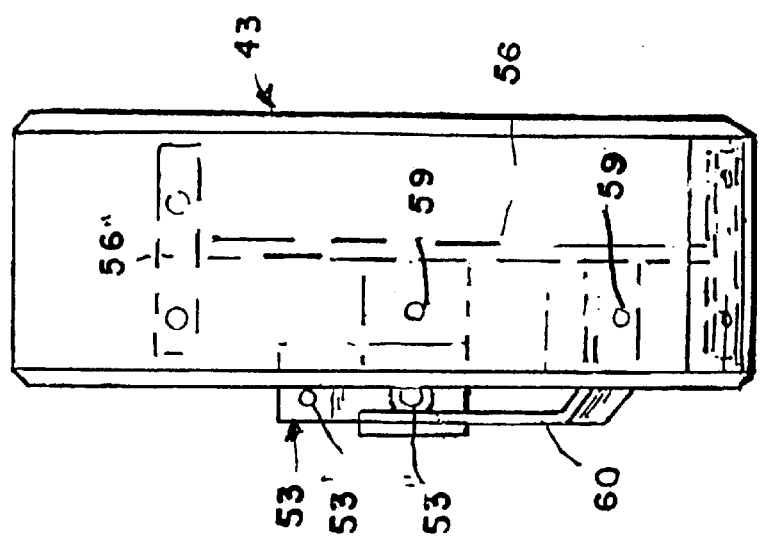

FENDER APPARATUS

This invention relates to grader fenders, and is a continuation in part of my earlier co pending patent application. U.S. Ser. No. 09/055,161, filed: Apr. 4, 1998, entitled Grader Fender Device, now abandoned.

It is an object of the invention to provide a novel grader fender device which can be easily and quickly attached and detached to a grader.

It is a further object of the invention to provide a novel grader fender device which has a mounting arm for attachment at its outer end to a grader so that the mounting arm and fender are attached together to the grader, and so that the mounting arm will not interfere or block any material from the ground thrown up by the action of the wheels of the grader when the grader is moving without the fenders attached.

It is a further object of the invention to provide a novel fender which can be attached or detached from the grader which a single pin attachment for each fender mounting to the grader.

It is another object of the invention to provide a novel fender construction which can be mounted rapidly to the front and rear wheels of the grader and which will not interfere with the grader operation.

It is another object of the invention to provide a novel front fender for a grader device which can be attached to the grader at least two mounting locations to provide additional strength to the mounting connection of the fender to the grader and to provide a novel fender that will turn with the wheels when the wheels turn to the left or to the right.

Further objects and advantages of the invention will become apparent as the description proceeds and when taken in conjunction with the accompanying drawings wherein:

BRIEF DESCRIPTION OF THE DRAWINGS

FIG. 1 is a side elevational view of the grader with the front and rear grader fenders detachably mounted to the front and rear wheels respectively of the grader. the front and rear wheels respectively of the grader.

FIG. 2 is a front elevational view of the grader taken along line 2—2 of FIG. 1 and illustrating the front grader fenders of the invention shown attached to the grader when the front wheels are upright.

FIG. 3 is an enlarged front side view of the front right fender shown attached to the grader till bar.

FIG. 4 is a front elevational view of the grader illustrating the front fenders tilting to one side with the front wheels, when the front wheels are tilted by the tilt bar, relative to the grader frame.

FIG. 5 is an enlarged top plan view of the right rear fenders illustrated mounted to the grader.

FIG. 6 is an enlarged top plan view of the right front fender illustrated mounted to the grader.

FIG. 7 is an enlarged side view of the right rear fenders.

FIG. 8 is an enlarged side view of the light front fender.

FIG. 9 is a rear elevational view of the rear fenders shown mounted to the rear of the grader.

FIG. 12 is a side elevational view of the modified form of right front fender device.

FIG. 13 is a top plan view of the right modified fender apparatus.

FIG. 14 is a top plan view of the right modified fender apparatus with the fender shown attached to the grader.

FIG. 15 is rear view of the right modified fender apparatus.

FIG. 16 is a cross sectional view taken along line 16—16 of FIG. 12.

BRIEF DESCRIPTION OF ALTERNATE EMBODIMENT

Figure 10:
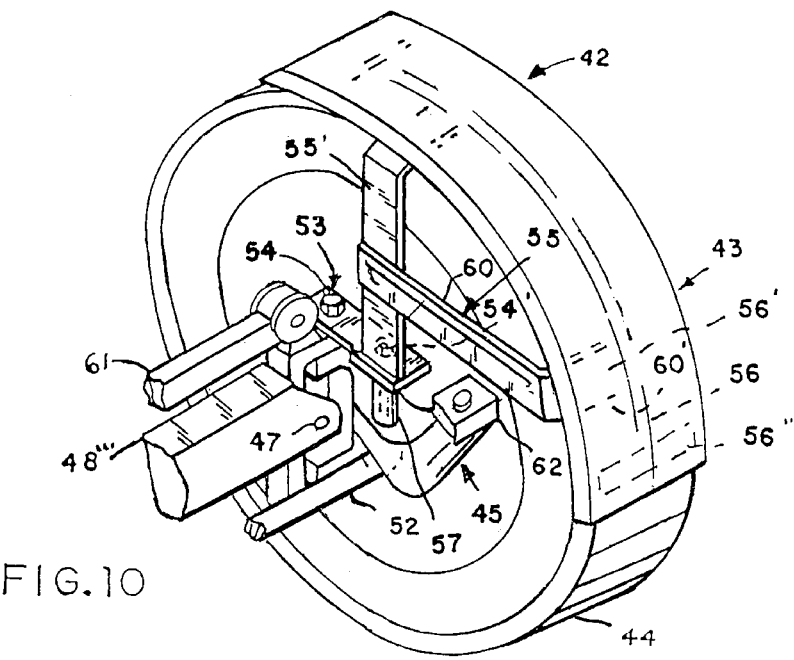
FIG. 10 is a perspective view of a modified form of fender device illustrating the right fender on the grader, wherein the fender mounting arm attaches to the grader at two locations and the arm and fender turn with the wheels of the grader when the wheels of the grader are turned to the left or right.

Briefly stated, the invention comprises a fender apparatus having front mounting arms for mounting to the leaning bar of the grader which arms extend upward from the leaning bar on each side of the upward to a point just above the top of the front wheels of the grader with the arms having generally horizontal sockets extending outward from the grader. An elongated fender is provided for mounting over the two front wheels of the grader having a rod extending laterally from an intermediate portion of the fender and with the outer end of the rod being receivable in the socket adjacent each of the front wheels. A pin is receivable in a hole in the outer end of the rod and in the socket of each front wheel for locking the rod of the fender to the socket of arm support of the device.

Referring more particularly to the drawings, in FIG. 1. The alternate embodiment of the fender apparatus 20 has a pair of front fenders 22 and 22" and a dual pair of rear fenders 23 and 23'. A pair of front supporting arms 24 and 24' have bolts 25 at their lower ends for attachment of the supporting arms to the leaning bar 26 at the front of the grader 21 for mounting the front fenders 22 and 22' to the front of the grader 21. At the upper end of the front supporting arms 24 and 24' are a pair of square sockets 27 and 27' which extend horizontally outward toward the front wheels 28 and 28' respectively of the grader 21, with the outer ends 27" of the sockets being open. The front and rear fenders each having elongated fender rods 29 fixed at their one ends 29' to the fender panel 30 and having their outer ends 29" in a square cross sectional outer conformation. The sockets 27 and 27' of the front supporting arms 24 and 24' each have a square inner conformation to slidably receive the outer square ends 29" of rods 29 in non rotational manner for mounting the front fenders 22 and 22" to the leaning bar 26 of the grader.

The front pair of fenders 22 and 22" and the dual pair of rear fenders 23 and 23' are intended to be mounted to a conventional grader 21. The grader 21 has a dual pair of rear wheels 31 and 31' with one pair 31 mounted on one side of the grader and the other pair 31' mounted on the other side of the grader. The left side rear pair of fenders 23 have a projecting pair of arms 32 and 33, respectively, with their lower ends mounted to the tandem housing or frame 34 of the grader and their upper ends each having horizontal sockets 35. Each left rear fender 23 has a horizontal rod 36 fixed at its one end 36' to the fender panel 30 with its other end 36" square and adapted to be slidably received in non rotational manner in the horizontal square sockets 35 of the arms.

Similarly, the right side pair of rear fenders 23' have a pair of projecting arms 32' and 33', respectively, with their lower ends mounted to the tandem 34 of the grader and their upper ends each having horizontal extending sockets 35. Each right rear fender 23' has a horizontal rod 36 fixed at its one end 36' to the fender with its other end 36" square and adapted to be slidably received in non rotational manner in the horizontal square sockets 35 of the arms on the right side of the grader.

The front and rear fenders apparatus each have vertical bores 37 extending through the horizontal sockets 35 of the front and rear supporting arms 24 and 24', 32 and 33, and 32' and 33', which bores 37, adapted to align with vertical bores through the square outer ends of the fender rods 36; so that a key pins 38 may be slid through the vertical bores in the sockets and through the vertical bore in the outer end of each fender rod to lock the fender rods in non rotating manner and thereby the fenders, in non rotating manner to the leaning bar of the grader at the front and the frame of the grader at the rear.

A pair of rubber grommets 39 are mounted between the panels 30 of the front fenders and the rods 29 with screws 39' extending through the fender panels 30 and threaded into the rods 29 to secure the fender panels 30 to the rods, with the rubber grommets providing a rubber cushioning action between the fender panels and the rods. The front fender 22 has a T shaped metal plate 41 which extends rearward from the lateral rod 29, with the base leg 41' fixed to the lateral rod 29 and extending rearward along the inside of the fender panel. The rear front fender 23 has a tubular curved rod 40' with its forward end fixed to the lateral rod 36 and extending rearward therefrom with similar rubber grommets and screws mounting the T shaped plate to the front fender panel. The rear fender 23' has front metal rod 40' which extends forward from the lateral rod 36 and a rear tubular metal rod 40" which extends rearward from the lateral rod 36 and is fixed to the lateral rod 36. Similar screws and rubber grommets between the outer ends of the curved metal rods and the fender panels act to provide a similar securing of the fender panels to the rods 36 and 40' and 40" in a cushioning relation. The curved metal rods provide additional reinforcement to the fender panels along their curved length to provide additional strength to the fenders when they are mounted to the grader.

Installation and Removal

Each fender can be easily and rapidly installed and removed from the grader. For installation, the square outer ends of each fender rod will be slidably inserted into the open outer ends of each square socket, and then the pins 38 will be inserted through the sockets and rods to lock the rods to the sockets and thereby lock the fenders to the grader. The fenders can be removed in reverse fashion, by simply removing the pins vertically upward and sliding each fender rod out of its socket.

Operation

The grader fender apparatus will operate as follows

The front fenders 22 and 22' act to direct mud thrown upward by the rotation of the front wheels 28 and 28' horizontally away and downward. When the front wheels 28 and 28' are tilted to an angle by the leaning bar 26, as illustrated in FIG. 4; the front fenders 22 and 22' will tilt with the leaning bar 26 and thereby tilt with the wheels 28 and 28' to either side when the front wheels are tilted to either side. When, however, the front wheels are turned to the left or to the right; the front fenders will not follow the turning of the front wheels, but will remain directed ahead when the wheels turn to the side, being fixed to the leaning bar which does not turn with the wheels.

Similarly, the rear fenders 23 and 23' will act to direct mud thrown upward by the rotation of the rear wheels 30 and 30' horizontally away to the side and downward. When it is desired to operate the grader without fenders, any and all of the fenders can be easily removed by removing the pins 37 and sliding the fender rods out of the sockets as already indicated.

Preferred Embodiment

Figure 11:
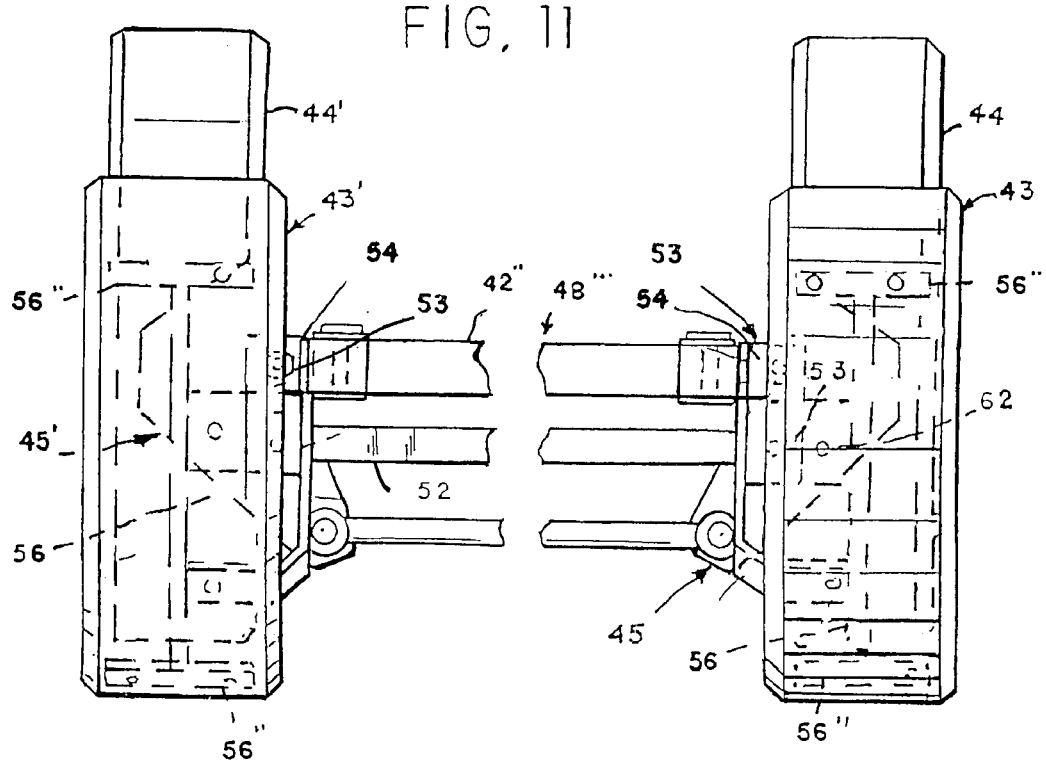
FIG. 11 is a top plan view of both the right and left front fenders of the modified form of fender with fenders shown attached to the front of the grader.

The subject matter being added by this continuation in part application is a modified preferred form of front fender apparatus 42 illustrated in FIGS. 10–15, inclusive. The modified front fender apparatus 42 has a pair of front fenders 43 and 43', as shown in FIG. 11, in which the fenders 43 and 43' cover each front wheel 44,44', respectively, left and right, of the conventional grader apparatus 44". This is similar to the grader apparatus shown in connection with the grader shown in FIGS. 1–9 of the first form of the grader fender apparatus.

The left and right front fenders 43 and 43' of the modified form of fender are each mounted to conventional grader of the type, which has a pair front wheels 44 and 44' each having a conventional front wheel axle housings 45,45', with each housing having a conventional pair of yoke or upper and lower arm members 46 and 46' fixed to the wheel housing, and extending over and under similar frame arms or yoke members 48' and 48" of end plates 48 of the frame of the grader. The end plates are pivotally mounted to the main frame 48''' of the grader about horizontal pivots 47, which extend along a horizontal axes extending along the length, front to rear of the grader frame 48". A threaded bolt 54, having a smooth cylindrical intermediate portion with a threaded portion, extends vertically through the upper yoke member 46 of the end plate and then is threaded into the upper yoke member 46 of each wheel housing 45,45' of the frame. A similar thread bolt 50 has a smooth portion extending upward through a vertical bore in the lower arm member 48" of the end plate, which is then is threaded into the lower arm or yoke member 46' of the wheel housing, and which acts to provide a pivotal mounting for each front wheel axle housing 45 to the pivoting end plates on the frame 48''' of the grader to pivot the front wheels and front wheel housings about a vertical axis 51 on the end plates of the frame.

A pair of conventional hydraulic steering pistons and cylinders 52 are mounted to the front of the frame of the conventional grader; with their cylinder portion, not shown, pivotally mounted to the grader frame adjacent the center and front of the grader and extending laterally outward toward each front wheel, with their piston 52' having socket 52" at its outer end. A mourn bolt 58 has a threaded outer end 58' and a ball 58" at its other end which is rotatably mounted in the socket of the piston to provide a ball and socket connection.

The fender apparatus 42 has a right and left fenders 43 and 43' for the right and left front wheels are mounted to right and left framework assemblies 55 and 55' of the graders. The right and left front fender fenders and their assemblies are reverse images of one another in constructin, operation, and installation; and for simplicity of disclosure, the right fender apparatus will be more specifically described.

The right and left fenders 43 and 43' each have a vertical framework 55 and 55' respectively with the upper ends 55" of the frames 55 and 55' mounted to mounting plates 56' of reinforcement rods 56, which rods are fixed to their respective fender. A horizontal plate 53 is fixed to the bottom of each framework 55 and 55'. Each fender apparatus 43 and 43' is mounted to the grader housing at two locations, by two bolts 54 and 54' which extend through the plate 53 and through spaced bores 53' and 53" of the plates at two spaced locations. The plate 53 fixed to the bottom of each vertical frame members 55 and 55' of the fender apparatus. The bolt 54 is removed from the upper yoke members 46 and 48'. It is reinserted though the bore 53' of the plate 53, then freelyb through the upper yoke member 48" of the end plate, and then threaded into bore in upper yoke member 46 of the wheel housing. The second long bolt 54' extends through a bore 53" in the plate 53 and its lower end 54" is threaded into the upper inner of a cynlindrical spacer sleeve 57n to mount the plate 53 also to the housing at the steering piston mounting to the housing.

The two bolt connections of the horizontal plates 53 act to mount each fender to the yoke and to the front wheel housings, and provide two spaced relatively strong connections of the fenders to the front wheel housings to securely look the fenders and their frames to the front wheel housings. The steering piston 52 has the conventional third bolt 58, with the a ball end mounted to a socket on the steering cylinder piston, extending upward through a bore in the wheel housing. Its upper end 58' is threaded into the lower end of the spacer sleeve 57 to pivotally mount the steering piston to the housing, while the plate 53 of the fender apparatus is mounted to the grader housing in the two different locations.

Since the steering piston mounting to the wheel housing is spaced below the horizontal plate, a spacer sleeve 57 is fitted between the horizontal plate 53 and the steering piston bolt 58 in the wheel housing to provide a fixed support in the space between the plate and the steering piston mounting on the wheel housing.

Each fender frame 55 and 55' has a laterally bent upper end 55" which is mounted to the mounting plate 56' of the reinforcement rod 56 of each fender 43 and 43'. Each fender also has a horizontal second brace 60 fixed to frame members 55 and 55' and extending horizontally toward the fenders wiht lateral ends 60'.

The fender reinforcement rod 56 is curved to the contour of the fender and has two mounting plates 56' fixed to the rod and extending laterally away. Bolts 59 extend through bores in the fender and are threaded into the mounting plates 56' and through the lateral ends 55" and 60' of the frames to fix the fenders to the frames. The reinforcement rods also have lateral end flanges 56" bolted to the fenders to lock the fenders 43 and 43' to the frames 55 and 55'. The fenders 43 and 43' being fixed to the yokes 46 and 46' of the front wheel housings provide a vertical pivotal connection to the grader frame; so that the fenders 43 and 43' pivot with the yokes of the wheel housings, when the front wheel housings and their yokes and front wheels are pivoted about a vertical axis to turn the front wheel housings and front wheels of the grader to either the right or left about their vertical axes.

The fenders 43 and 43', in the modified form shown in FIGS. 10–15, also pivot with the yokes of the wheel housings, when the wheel housing yokes pivot about their horizontal pivot axes when the front wheels tilt to one side or the other by a tilt bar 61. Consequently, the fenders 43 and 43' pivot with wheel housings about both the vertical axis and horizontal axis with the front wheels.

A conventional tie rod 62 is pivotally mounted at its end to each wheel housing to pivot the wheel housings for the front wheels about their vertical axes in unison. The tilt bar 61 is conventional and is pivotally mounted to the tops of the end plates 48 and is powered by a hydraulic pistion and cylinder, not shown, to pivot the tilt bar about the their pivotal mounting 47' to the end plates, to thereby pivot the end plates about their horizontal pivots 47 to grader frame, to thereby tilt the end plates which in turn tilt the wheel housings, wheels and the fenders to one side or the other of the grader about the horizontal pivots 47 of the grader.

What is claimed is:

1. In a grader apparatus having a frame with said frame having a front left and right sides and a pair of front wheels with a wheel housing for each wheel with each wheel rotatably mounted in the wheel housing, a pair of pivotal end plates at the front left and right sides of the frame pivotally mounted to the frame to pivot about a horizontal axis for tilting the end plates relative to the frame, each wheel housing having a first pivotal mounting comprising an upper and lower pivot means pivotally mounted to said end plates to pivot about a vertical axis, each wheel housing having a second pivotal mounting means spaced from said first pivotal mounting means, a hydraulic steering cylinder having a cylinder and piston for turning the wheel housing with the piston having its end adapted to pivotally mount to the second pivotal mounting means of the wheel housing;

a fender apparatus for mounting to said wheel housing of said grader apparatus at said first and second pivotal mounting means comprising a curved fender, a fender support frame, said support frame having a vertical panel with said panel having an upper and lower end with said fender mounted to said upper end of said vertical panel with said fender adapted to extend over one of said front wheels, a fender mounting means at the lower end of said vertical panel having spaced bores therein, pin means extending through one of said vertical bores of said fender mounting means and extending freely through said end plate and threaded into said upper pivot means of said first pivotal mounting means of said wheel housing to provide a first pivotal mounting support for said fender, a second pin means extending through the other of the bores of said fender mounting means through said pivotal mounting of said piston and threaded into said second pivotal mounting of said wheel housing to provide a second pivotal mounting support for said fender, to thereby provide a first and second mounting means spaced from one another for supporting said fender mounting means, and thereby support said fender to said wheel housing, whereby the fender will turn as well as tilt with the wheel housing.

2. A fender apparatus according to claim 1 wherein said fender mounting means at said lower end of said fender support frame comprises a horizontal plate with said spaced bores being spaced horizontally along said horizontal plate and extending vertically through said plate of said grader.

3. In a grader apparatus having a frame with said frame having a front left and right sides and a pair of front wheels with a wheel housing for each wheel with each wheel rotatably mounted in the wheel housing, a pair of pivotal end plates a the front left and right sides of the frame pivotally mounted to the frame to pivot about a horizontal axes for tilting the end plates relative to the frame, each wheel housing having a first pivotal mounting comprising an upper and lower pivot means pivotally mounted to said end plates to pivot about a vertical axis, each wheel housing having a second pivotal mounting means spaced from the first pivotal mounting means, a hydraulic steering cylinder having a cylinder and piston for turning the wheel housing with the piston having an end adapted to pivotally mount to the second pivotal mounting means of the wheel housing;

a fender apparatus for mounting to said wheel housing of said grader apparatus at said first and second pivotal mounting means comprising a curved fender, a fender support frame, said support frame having an upward extending panel with said panel having an upper and lower end with said fender mounted to said upper end of said panel with said fender adapted to extend over one of said wheels, a fender mounting means at the lower end of said upward extending panel having spaced pin mounting means thereon, pin means extending through one of said pin mounting means of said fender mounting means and extending through said end plate and secured to said upper pivot means of said first pivotal mounting means of said wheel housing to provide a first pivotal mounting support for said fender, a second pin means extending through the other of the pin mounting means of said fender mounting means and through said pivotal mounting of said piston and secured into said second pivotal mounting means of said wheel housing to provide a second pivotal mounting support for said fender, to thereby provide a first and second mounting means spaced from one another for supporting said fender mounting means, and thereby support said fender to said wheel housing, whereby the fender will turn as well as tilt with the wheel housing.

* * * * *